United States Patent
Valdes Garcia et al.

(10) Patent No.: US 12,430,868 B2
(45) Date of Patent: Sep. 30, 2025

(54) GUIDED MULTI-SPECTRAL INSPECTION

(71) Applicant: INTERNATIONAL BUSINESS MACHINES CORPORATION, Armonk, NY (US)

(72) Inventors: Alberto Valdes Garcia, Chappaqua, NY (US); Ahmet Serkan Ozcan, Los Altos, CA (US); Vincent Albouy, San Francisco, CA (US); Asaf Tzadok, New Castle, NY (US); Petar K. Pepeljugoski, Tarrytown, NY (US); Jean-Olivier Plouchart, New York, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 326 days.

(21) Appl. No.: 16/928,371

(22) Filed: Jul. 14, 2020

(65) Prior Publication Data

US 2022/0021822 A1    Jan. 20, 2022

(51) Int. Cl.
*B64U 101/30* (2023.01)
*G03B 15/00* (2021.01)
*G06V 10/24* (2022.01)

(52) U.S. Cl.
CPC ............ *G06V 10/24* (2022.01); *G03B 15/00* (2013.01); *B64U 2101/30* (2023.01)

(58) Field of Classification Search
CPC .. H04N 5/332; B64C 39/024; B64C 2201/127
See application file for complete search history.

(56) References Cited

U.S. PATENT DOCUMENTS

| | | |
|---|---|---|
| 5,963,653 A | 10/1999 | McNary et al. |
| 7,298,869 B1 | 11/2007 | Abernathy |

(Continued)

FOREIGN PATENT DOCUMENTS

| | | |
|---|---|---|
| CN | 107609522 A | 1/2018 |
| CN | 110913150 A | 3/2020 |

(Continued)

OTHER PUBLICATIONS

International Search Report issued in PCT Application No. PCT/CN2021/106017, Dated Sep. 28, 2021, pp. 1-10.

(Continued)

*Primary Examiner* — Kito R Robinson
*Assistant Examiner* — Roy Rhee
(74) *Attorney, Agent, or Firm* — Tutunjian & Bitetto, P.C; Stosch Sabo

(57) ABSTRACT

An imaging system is provided. A first imaging system captures initial sensor data in a form of visible domain data. A second imaging system captures subsequent sensor data in a form of second domain data, wherein the initial and subsequent sensor data are of different spectral domains. A controller subsystem detects at least one region of interest in real-time by applying a machine learning technique to the visible domain data, localizes at least one object of interest in the at least one region of interest to generate positional data for the at least one object of interest, and autonomously steers a point of focus of the second imaging system to a region of a scene including the object of interest to capture the second domain data responsive to the positional data.

17 Claims, 9 Drawing Sheets

(56) References Cited

U.S. PATENT DOCUMENTS

| | | |
|---|---|---|
| 8,027,029 B2 | 9/2011 | Lu et al. |
| 9,523,609 B2 | 12/2016 | Vallejo Veiga et al. |
| 9,671,493 B1 | 6/2017 | Khosla et al. |
| 9,729,803 B2 | 8/2017 | Holliday |
| 10,078,791 B2 | 9/2018 | Justice et al. |
| 10,094,925 B1 | 10/2018 | LaChapelle |
| 10,353,053 B2 | 7/2019 | Rohani et al. |
| 10,574,970 B2 | 2/2020 | Zhu et al. |
| 10,997,739 B2 | 5/2021 | Zuta et al. |
| 12,105,204 B2 | 10/2024 | Nagashima et al. |
| 2003/0210329 A1* | 11/2003 | Aagaard ............... H04N 17/002 348/E7.086 |
| 2008/0099678 A1 | 5/2008 | Johnson et al. |
| 2010/0328644 A1 | 12/2010 | Lu et al. |
| 2014/0346359 A1 | 11/2014 | Holliday |
| 2016/0055400 A1 | 2/2016 | Jorquera et al. |
| 2019/0144001 A1* | 5/2019 | Choi ................ G08G 1/096791 701/117 |
| 2019/0302232 A1 | 10/2019 | Harrison |
| 2019/0373173 A1 | 12/2019 | Wang et al. |
| 2020/0019039 A1* | 1/2020 | Hong ..................... G03B 33/00 |
| 2020/0139973 A1* | 5/2020 | Palanisamy ............ G06N 5/046 |
| 2021/0112193 A1 | 4/2021 | Haar et al. |
| 2021/0262758 A1* | 8/2021 | Parker ....................... F41G 1/38 |
| 2021/0368094 A1* | 11/2021 | Li .................... H04N 5/232939 |

FOREIGN PATENT DOCUMENTS

| | | | |
|---|---|---|---|
| EP | 3232658 | A1 | 10/2017 |
| GB | 2512886 | A | 10/2014 |
| JP | H1116099 | A | 1/1999 |
| JP | 2004-205398 | A | 7/2004 |
| JP | 2007-240208 | A | 9/2007 |
| JP | 2019-185689 | A | 10/2019 |
| JP | 2020-090196 | A | 6/2020 |
| RU | 2242770 | C2 | 12/2004 |
| WO | 2014/136499 | A1 | 9/2014 |
| WO | 2016114897 | A1 | 7/2016 |
| WO | 2018/123013 | A1 | 7/2018 |
| WO | 2018/188877 | A1 | 10/2018 |
| WO | 2019/133246 | A1 | 7/2019 |
| WO | 2020/022185 | A1 | 1/2020 |
| WO | 2020/041214 | A1 | 2/2020 |

OTHER PUBLICATIONS

Farlik et al., "Multispectral Detection of Commercial Unmanned Aerial Vehicles", Sensors 2019, Mar. 2019, pp. 1-28.

Vakalopoulou et al., "Building Detection in Very High Resolution Multispectral Data with Deep Learning Features", IGARSS 2015, Feb. 2015, pp. 1873-1876.

Mell et al. "The NIST Definition of Cloud Computing", NIST Special Publication 800-145, 2011, 7 pages.

Intellectual Property Office, "Patents Act 1977: Exam Report under Section 18(3)", Apr. 29, 2025, 07 Pages, GB Application No. 2301709.8.

Japan Patent Office, "Notice of Reasons for Refusal,", Dec. 2, 2024, 14 Pages, JP Application No. 2023-502696.

Nguyen et al. "ROI-Based LiDAR Sampling Algorithm in on-Road Environment for Autonomous Driving", IEEE Access, Jul. 5, 2019, pp. 90243-90253, vol. 7.

\* cited by examiner

GUIDED MULTI-SPECTRAL INSPECTION

BACKGROUND

The present invention generally relates to imaging systems, and more particularly to guided multi-spectral inspection.

Due to the emergence of compact and portable imaging sensors such as cameras, IR cameras, and imaging radars, it is now possible to perform multi-spectral imaging of a given scene. Each portion of the spectrum provides different information which may be relevant to a given application. For example, a millimeter-wave (mmWave) imaging radar has the ability to obtain information (approximate shape and reflectivity) from objects located behind/inside opaque materials such as carton packaging or fabrics.

At the same time, computer vision (CV) algorithms and machine-learning (ML) methods have matured significantly and it is now possible to extract information from visible-domain cameras and/or video automatically. For example, it is possible to automatically identify the location of a certain type of object in a scene.

A mmWave imager operates by forming a beam, steering such beam to illuminate a given portion of a scene, receiving the reflected signal (with a receiver beam pointing in the same direction), and obtaining reflectivity and distance from objects in that beam direction through signal processing techniques. Images are formed by repeating this process along multiple locations. There is a general tradeoff between the mmWave imaging performance (speed, accuracy, signal-to-noise ratio, spatial resolution), and the size of the area of interest. While a mmWave image may have an overall field of view (FoV) wider than a camera, for best results (higher frame rate, higher spatial resolution, less energy consumption) it is preferred to only scan the most relevant portion of the scene at a time.

SUMMARY

According to aspects of the present invention, an imaging system is provided. The imaging system includes a first imaging system captures initial sensor data in a form of visible domain data. The imaging system further includes a second imaging system captures subsequent sensor data in a form of second domain data, wherein the initial and the subsequent sensor data are of different spectral domains. The imaging system also includes a controller subsystem that detects at least one region of interest in real-time by applying a machine learning technique to the visible domain data, localizes at least one object of interest in the at least one region of interest to generate positional data for the at least one object of interest, and autonomously steers a point of focus of the second imaging system to a region of a scene including the object of interest to capture the second domain data responsive to the positional data.

According to other aspects of the present invention, a method for imaging is provided. The method includes capturing, by a first imaging system, initial sensor data in a form of visible domain data. The method further includes detecting, by a controller subsystem, at least one region of interest in real-time by applying a machine learning technique to the visible domain data. The method also includes localizing, by the controller subsystem, at least one object of interest in the at least one region of interest to generate positional data for the at least one object of interest. The method additionally includes autonomously steering, by the controller subsystem, a point of focus of a second imaging system to a same or similar scene to capture subsequent sensor data in a form of second domain data responsive to the positional data, wherein the initial and the subsequent sensor data are of different spectral domains.

According to yet other aspects of the present invention, a computer program product for imaging is provided. The computer program product includes a non-transitory computer readable storage medium having program instructions embodied therewith. The program instructions are executable by a computing system to cause the computing system to perform a method. The method includes capturing, by a first imaging system of the computing system, initial sensor data in a form of visible domain data. The method further includes detecting, by a controller subsystem of the computing system, at least one region of interest in real-time by applying a machine learning technique to the visible domain data. The method also includes localizing, by the controller subsystem, at least one object of interest in the at least one region of interest to generate positional data for the at least one object of interest. The method additionally includes autonomously steering, by the controller subsystem, a point of focus of a second imaging system of the computing system to a same or similar scene to capture subsequent sensor data in a form of second domain data responsive to the positional data. The initial and the subsequent sensor data are of different spectral domains.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to guided multi-spectral inspection.

One or more embodiments of the present invention enable the information extracted in one spectral domain (e.g., visible domain) guide the operation of a sensor in a different spectral domain (e.g. imaging radar). In particular, one or more embodiments of the present invention describe having visible-domain information define a specific location in a scene where an imaging radar or second imaging device should focus.

One or more embodiments of the present invention can involve identifying an object of interest using artificial intelligence (AI)-driven attention.

As one example of a problem solved by the present invention, it is noted that there is a general trade-off between mmWave imaging performance (speed, accuracy, signal-to-noise ratio, system complexity) and the size of an area of interest. While a mmWave imager (or exemplary second imaging system) may have an overall field of view (FoV) wider than a camera (or exemplary first imaging system), for best results it is preferred to only scan the most relevant portion of the scene at a given time. One or more embodiment of the present invention address the trade-off by autonomous detection of the region of interest by processing the images captured using the first imaging system, which can then be scanned fast by the mmWave radar.

To that end, the present invention uses a pre-trained neural network which has learned to focus attention to a region of interest in an image captured by the first imaging system to guide the second imaging system to a same or similar scene.

In an embodiment, a first imaging system is configured to capture initial sensor data in a form of visible-domain data, and a second imaging system is configured to capture subsequent sensor data in a form of second spectral domain data. In an embodiment, the subsequent imaging data has different perception properties than the initial imaging data. For example, the second imaging data can be from a mmWave radar with 3D perception capabilities and the ability to detect objects that are partially or completely covered by materials that are opaque in the visible domain such as fabrics, carton, and plastic.

Figure 1:
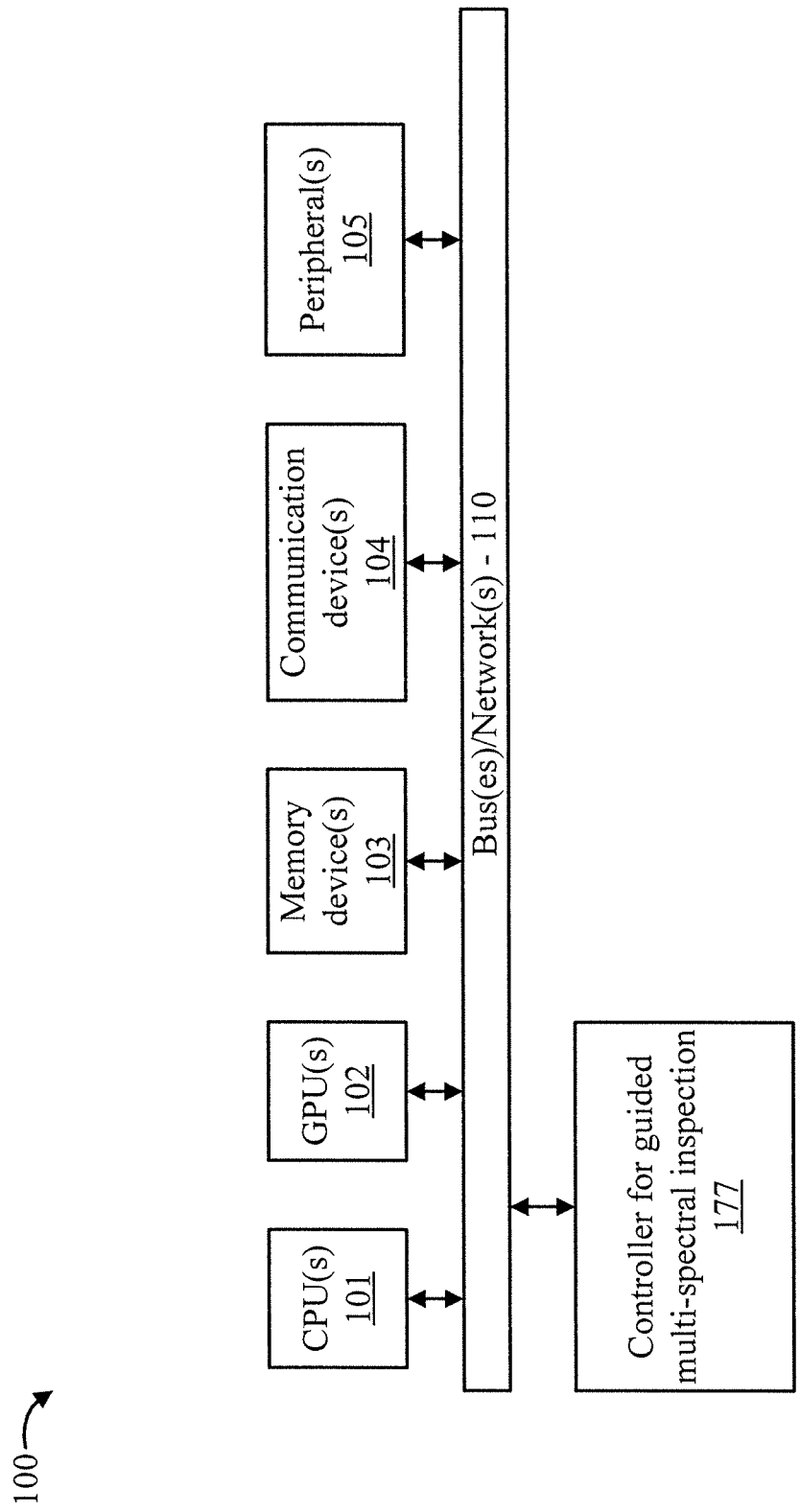
FIG. 1 is a block diagram showing an exemplary processing system, in accordance with an embodiment of the present invention.

FIG. 1 is a block diagram showing an exemplary processing system 100, in accordance with an embodiment of the present invention. Processing system 100 can serve as sensor control and data processing subsystem 430 of FIG. 4. The processing system 100 includes a set of processing units (e.g., CPUs) 101, a set of GPUs 102, a set of memory devices 103, a set of communication devices 104, and set of peripherals 105. The CPUs 101 can be single or multi-core CPUs. The GPUs 102 can be single or multi-core GPUs. The one or more memory devices 103 can include caches, RAMs, ROMs, and other memories (flash, optical, magnetic, etc.). The communication devices 104 can include wireless and/or wired communication devices (e.g., network (e.g., WIFI, etc.) adapters, etc.). The peripherals 105 can include a display device, a user input device, a printer, an imaging device, and so forth. Elements of processing system 100 are connected by one or more buses or networks (collectively denoted by the figure reference numeral 110).

In an embodiment, processing system 100 further includes a controller 177 for guided multi-spectral inspection. The controller 177 can be implemented by ASICs, FPGAs, and so forth. In an embodiment, the controller 177 has an on-board memory for storing program code for performing guided multi-spectral inspection. In other embodiments, the program code can be stored in memory device 103. In other embodiments, controller 177 is embodied by CPU(s) 101 and/or GPU(s) 102. These and other variations can be readily implemented, as readily appreciated by one of ordinary skill in the art, given the teachings of the present invention provided herein.

In an embodiment, memory devices 103 can store specially programmed software modules to transform the computer processing system into a special purpose computer configured to implement various aspects of the present invention. In an embodiment, special purpose hardware (e.g., Application Specific Integrated Circuits, Field Programmable Gate Arrays (FPGAs), and so forth) can be used to implement various aspects of the present invention.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 8-9). These and other variations of the processing system 100 are readily contemplated by one of ordinary skill in the art given the teachings of the present invention provided herein.

Moreover, it is to be appreciated that various figures as described below with respect to various elements and steps relating to the present invention that may be implemented, in whole or in part, by one or more of the elements of system 100.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

Such hardware processor can be used to perform guided multi-spectral inspection using multiple sensor data.

These and other variations of a hardware processor subsystem are also contemplated in accordance with embodiments of the present invention.

Figure 2:
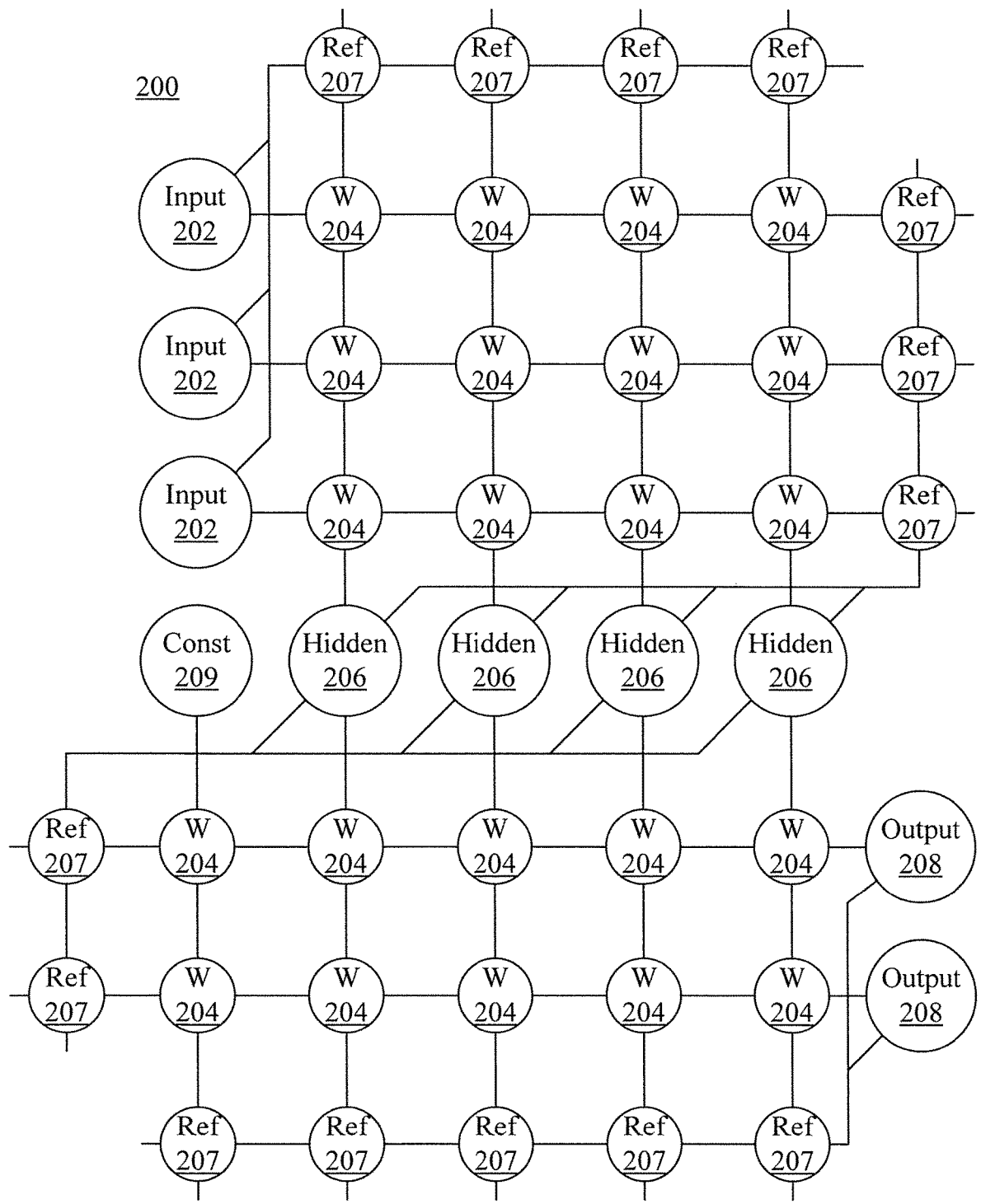
FIG. 2 is a block diagram showing an exemplary Artificial Neural Network (ANN) architecture, in accordance with an embodiment of the present invention.

FIG. 2 is a block diagram showing an exemplary Artificial Neural Network (ANN) architecture 200, in accordance with an embodiment of the present invention. It should be understood that the present architecture is purely exemplary and that other architectures or types of neural network can be used instead. In particular, while a hardware embodiment of an ANN is described herein, it should be understood that neural network architectures can be implemented or simulated in software. The hardware embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, softmax layers, or any other appropriate type of neural network layer. Furthermore, layers can be added or removed as needed and the weights can be omitted for more complicated forms of interconnection.

During feed-forward operation, a set of input neurons 202 each provide an input voltage in parallel to a respective row of weights 204. In the hardware embodiment described herein, the weights 204 each have a settable resistance value, such that a current output flows from the weight 204 to a respective hidden neuron 206 to represent the weighted input. In software embodiments, the weights 204 can simply be represented as coefficient values that are multiplied against the relevant neuron outputs.

Following the hardware embodiment, the current output by a given weight 204 is determined as $$I = \frac{V}{r},$$

where V is the input voltage from the input neuron 202 and r is the set resistance of the weight 204. The current from each weight adds column-wise and flows to a hidden neuron 206. A set of reference weights 207 have a fixed resistance and combine their outputs into a reference current that is provided to each of the hidden neurons 206. Because conductance values can only be positive numbers, some reference conductance is needed to encode both positive and negative values in the matrix. The currents produced by the weights 204 are continuously valued and positive, and therefore the reference weights 207 are used to provide a reference current, above which currents are considered to have positive values and below which currents are considered to have negative values. The use of reference weights 207 is not needed in software embodiments, where the values of outputs and weights can be precisely and directly obtained. As an alternative to using the reference weights 207, another embodiment can use separate arrays of weights 204 to capture negative values.

The hidden neurons 206 use the currents from the array of weights 204 and the reference weights 207 to perform some calculation. The hidden neurons 206 then output a voltage of their own to another array of weights 204. This array performs in the same way, with a column of weights 204 receiving a voltage from their respective hidden neuron 206 to produce a weighted current output that adds row-wise and is provided to the output neuron 208.

It should be understood that any number of these stages can be implemented, by interposing additional layers of arrays and hidden neurons 206. It should also be noted that some neurons can be constant neurons 209, which provide a constant output to the array. The constant neurons 209 can be present among the input neurons 202 and/or hidden neurons 206 and are only used during feed-forward operation.

During back propagation, the output neurons 208 provide a voltage back across the array of weights 204. The output layer compares the generated network response to training data and computes an error. The error is applied to the array as a voltage pulse, where the height and/or duration of the pulse is modulated proportional to the error value. In this example, a row of weights 204 receives a voltage from a respective output neuron 208 in parallel and converts that voltage into a current which adds column-wise to provide an input to hidden neurons 206. The hidden neurons 206 combine the weighted feedback signal with a derivative of its feed-forward calculation and stores an error value before outputting a feedback signal voltage to its respective column of weights 204. This back propagation travels through the entire network 200 until all hidden neurons 206 and the input neurons 202 have stored an error value.

During weight updates, the input neurons 202 and hidden neurons 206 apply a first weight update voltage forward and the output neurons 208 and hidden neurons 206 apply a second weight update voltage backward through the network 200. The combinations of these voltages create a state change within each weight 204, causing the weight 204 to take on a new resistance value. In this manner the weights 204 can be trained to adapt the neural network 200 to errors in its processing. It should be noted that the three modes of operation, feed forward, back propagation, and weight update, do not overlap with one another.

As noted above, the weights 204 can be implemented in software or in hardware, for example using relatively complicated weighting circuitry or using resistive cross point devices. Such resistive devices can have switching characteristics that have a non-linearity that can be used for processing data. The weights 204 can belong to a class of device called a resistive processing unit (RPU), because their non-linear characteristics are used to perform calculations in the neural network 200. The RPU devices can be implemented with resistive random access memory (RRAM), phase change memory (PCM), programmable metallization cell (PMC) memory, or any other device that has non-linear resistive switching characteristics. Such RPU devices can also be considered as memristive systems.

Figure 3:
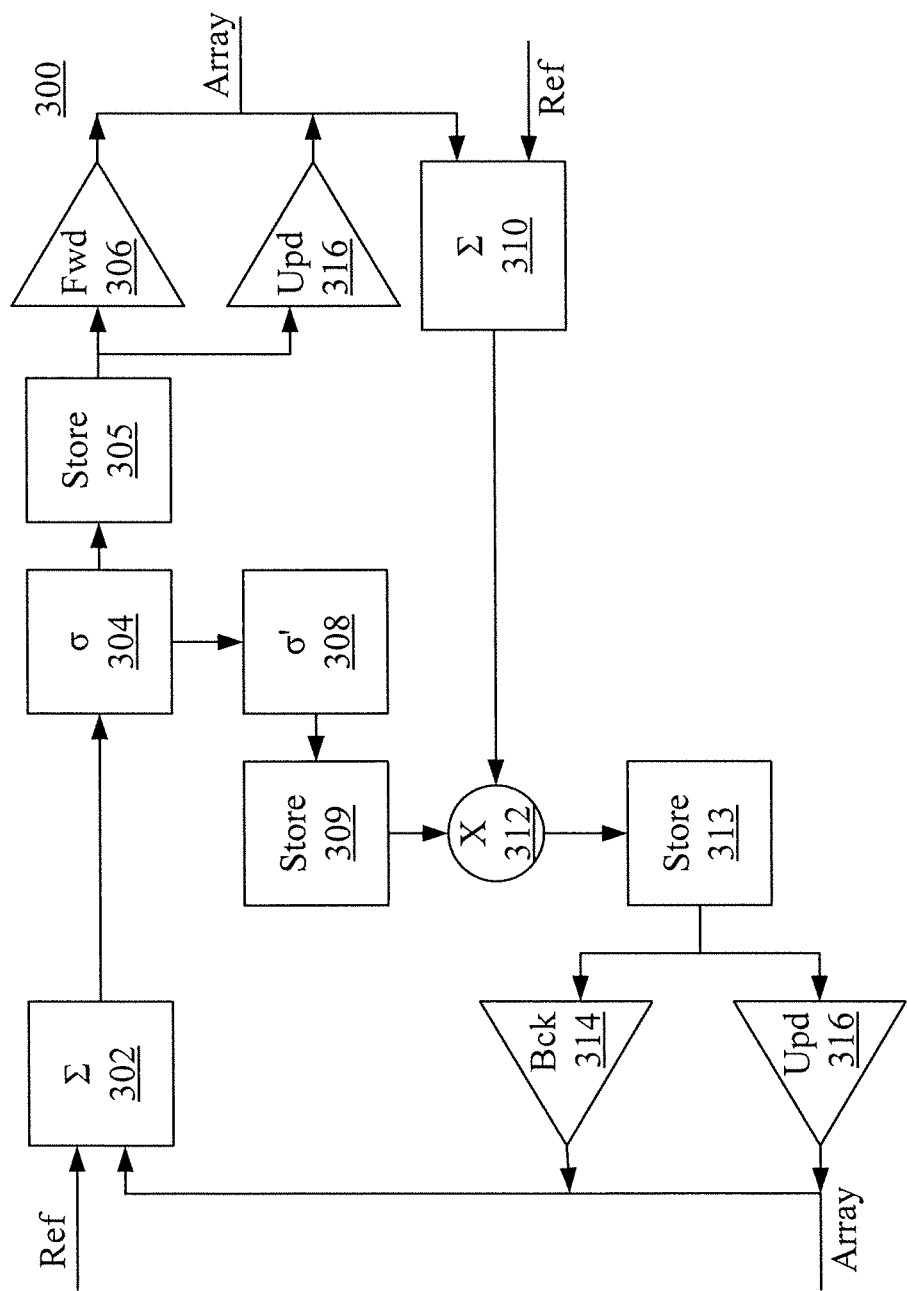
FIG. 3 is a block diagram showing an exemplary neuron, in accordance with an embodiment of the present invention.

FIG. 3 is a block diagram showing an exemplary neuron 300, in accordance with an embodiment of the present invention. This neuron can represent any of the input neurons 202, the hidden neurons 206, or the output neurons 208. It should be noted that FIG. 3 shows components to address all three phases of operation: feed forward, back propagation, and weight update. However, because the different phases do not overlap, there will necessarily be some form of control mechanism within the neuron 300 to control which components are active. It should therefore be understood that there can be switches and other structures that are not shown in the neuron 300 to handle switching between modes.

In feed forward mode, a difference block 302 determines the value of the input from the array by comparing it to the reference input. This sets both a magnitude and a sign (e.g., + or −) of the input to the neuron 300 from the array. Block 304 performs a computation based on the input, the output of which is stored in storage 305. It is specifically contemplated that block 304 computes a non-linear function and can be implemented as analog or digital circuitry or can be performed in software. The value determined by the function block 304 is converted to a voltage at feed forward generator 306, which applies the voltage to the next array. The signal propagates this way by passing through multiple layers of arrays and neurons until it reaches the final output layer of neurons. The input is also applied to a derivative of the non-linear function in block 308, the output of which is stored in memory 309.

During back propagation mode, an error signal is generated. The error signal can be generated at an output neuron 208 or can be computed by a separate unit that accepts inputs from the output neurons 208 and compares the output to a correct output based on the training data. Otherwise, if the neuron 300 is a hidden neuron 206, it receives back propagating information from the array of weights 204 and compares the received information with the reference signal at difference block 310 to provide a continuously valued, signed error signal. This error signal is multiplied by the derivative of the non-linear function from the previous feed forward step stored in memory 309 using a multiplier 312, with the result being stored in the storage 313. The value determined by the multiplier 312 is converted to a backwards propagating voltage pulse proportional to the computed error at back propagation generator 314, which applies the voltage to the previous array. The error signal propagates in this way by passing through multiple layers of arrays and neurons until it reaches the input layer of neurons 202.

During weight update mode, after both forward and backward passes are completed, each weight 204 is updated proportional to the product of the signal passed through the weight during the forward and backward passes. The update signal generators 316 provide voltage pulses in both directions (though note that, for input and output neurons, only one direction will be available). The shapes and amplitudes of the pulses from update generators 316 are configured to change a state of the weights 204, such that the resistance of the weights 204 is updated.

In contrast to forward and backward cycles, implementing the weight update on a 2D crossbar array of resistive processing units locally and all in parallel, independent of the array size, is challenging. It requires calculating a vector-vector outer product and may require a multiplication operation and an incremental weight update to be performed locally at each cross-point.

Figure 4:
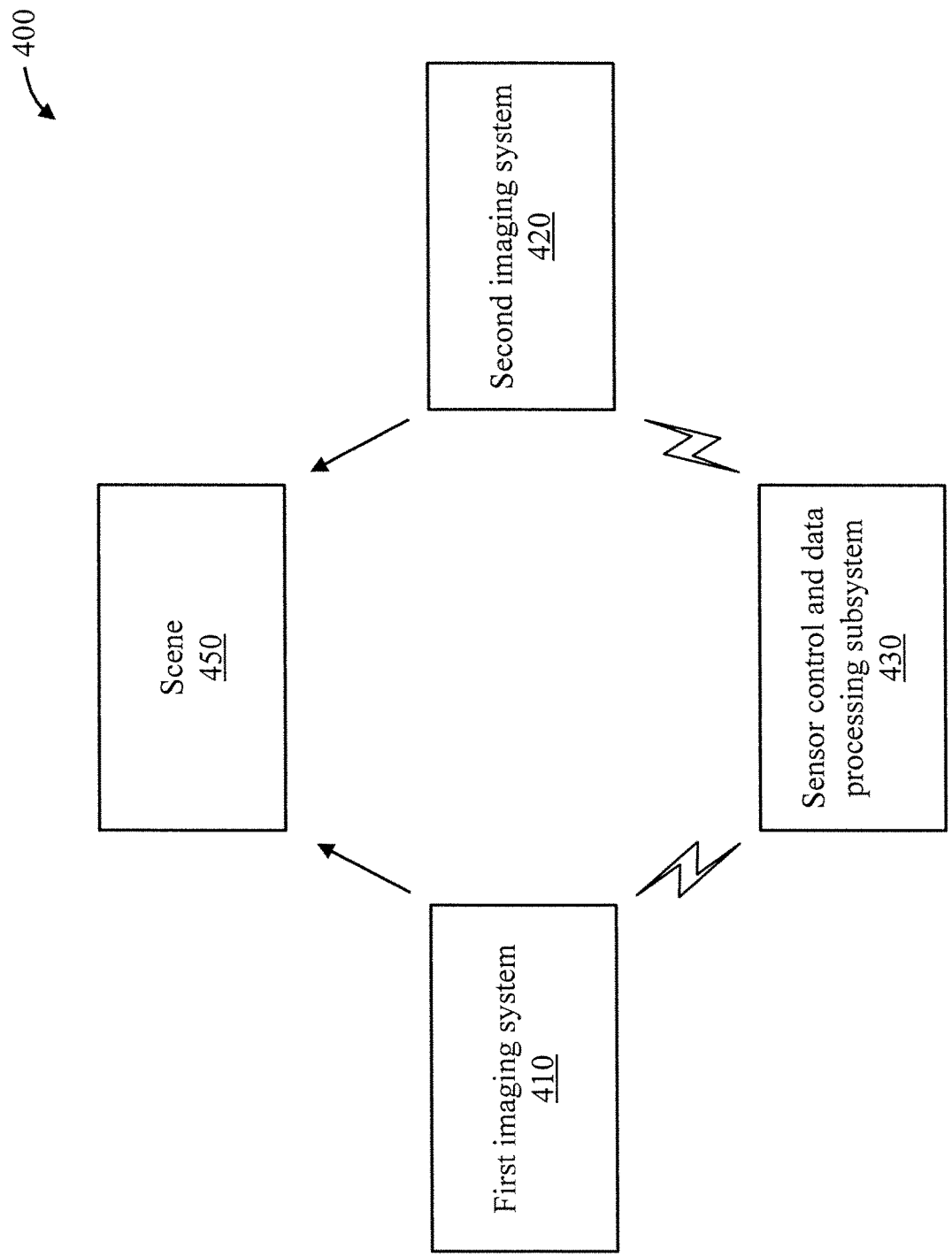
FIG. 4 is a block diagram showing an exemplary system for guided multi-spectral inspection, in accordance with an embodiment of the present invention.

FIG. 4 is a block diagram showing an exemplary system 400 for guided multi-spectral inspection, in accordance with an embodiment of the present invention.

The system 400 includes a first imaging system 410, a second imaging system 420, and a sensor control and data processing sub-system 430. In an embodiment, one or both of first imaging system 410 and second imaging system 420 can include a delivery system for delivering the system to an intended scene having a potential target of interest(s) thereat. For example, after the first imaging system finds an area of interest, then a delivery system such as a drone could deploy the second imaging system for the additional scanning of the area of interest. However, other embodiments have the first and the second imaging systems co-located and operating simultaneously to reduce latency to a minimum. Within fractions of a second, an inference from the second imaging system on the area of interest identified by the first could be obtained.

In an embodiment, the sensor control and data processing sub-system 430, the first imaging system 410 and the second imaging system 420 are enabled for wireless communications therebetween. In other embodiments, other types of connections can be used.

The images from both the first imaging system 410 and second imaging system 420 share a common set of x, y coordinates in a same or similar scene (here, show as same scene 450). In an embodiment, the origins in both scenes are the same for quick reference relative to each other.

In the example of FIG. 4, the scene can be of a train platform, where there is an unattended bag.

An object of interest, in the above example the unattended bag, and its location can be identified by a computer vision (CV) or machine-learning ML algorithm applied on the data captured by the first imaging system The shared coordinates are used to control the imaging region to which the second imaging system 420 is directed (pointed). It is presumed that the second imaging system 420 includes electronic beam scanning capabilities or other means for illuminating and obtaining imaging data from a specific FoV.

In an embodiment, the first imaging system 410 includes a camera. In an embodiment, the camera is a RGB camera. In an embodiment, the camera is an infrared (IR) camera. Of course, other types of cameras and imaging devices can be included in first imaging system 410.

In an embodiment, the second imaging system is a radar imager. In an embodiment, the radar imager is a mmWave radar imager with beam forming and beam steering capabilities. Of course, other types of radar imagers and imaging systems can be used as second imaging device.

In an embodiment, implementations of the present invention are configured to use the coordinates of images captured by the first imaging system 410 to define the effective FoV or control a point of aim of the second imaging system 420. This is achieved by sharing the coordinates between the two imaging devices/systems 410 and 420. In practical implementations, the first and second imaging systems 410 and 420 include electronic or mechanical control mechanism in order to control the effective FoVs or points of aims of the respective systems.

It is envisioned that the first imaging system and the second imaging system are different imaging system capable of capturing respective images in respective different domains.

As examples to which the present invention is not to be limited, an imaging system in accordance with the present invention can be used in vehicles for autonomous driving, defensive driving, and obstacle avoidance, for robotic control in a warehouse or manufacturing (car, machine, processor-controlled system, etc.) facility, and for a myriad of other applications readily contemplated by one of ordinary skill in the art given the teachings of the present invention provided herein.

Figure 5:
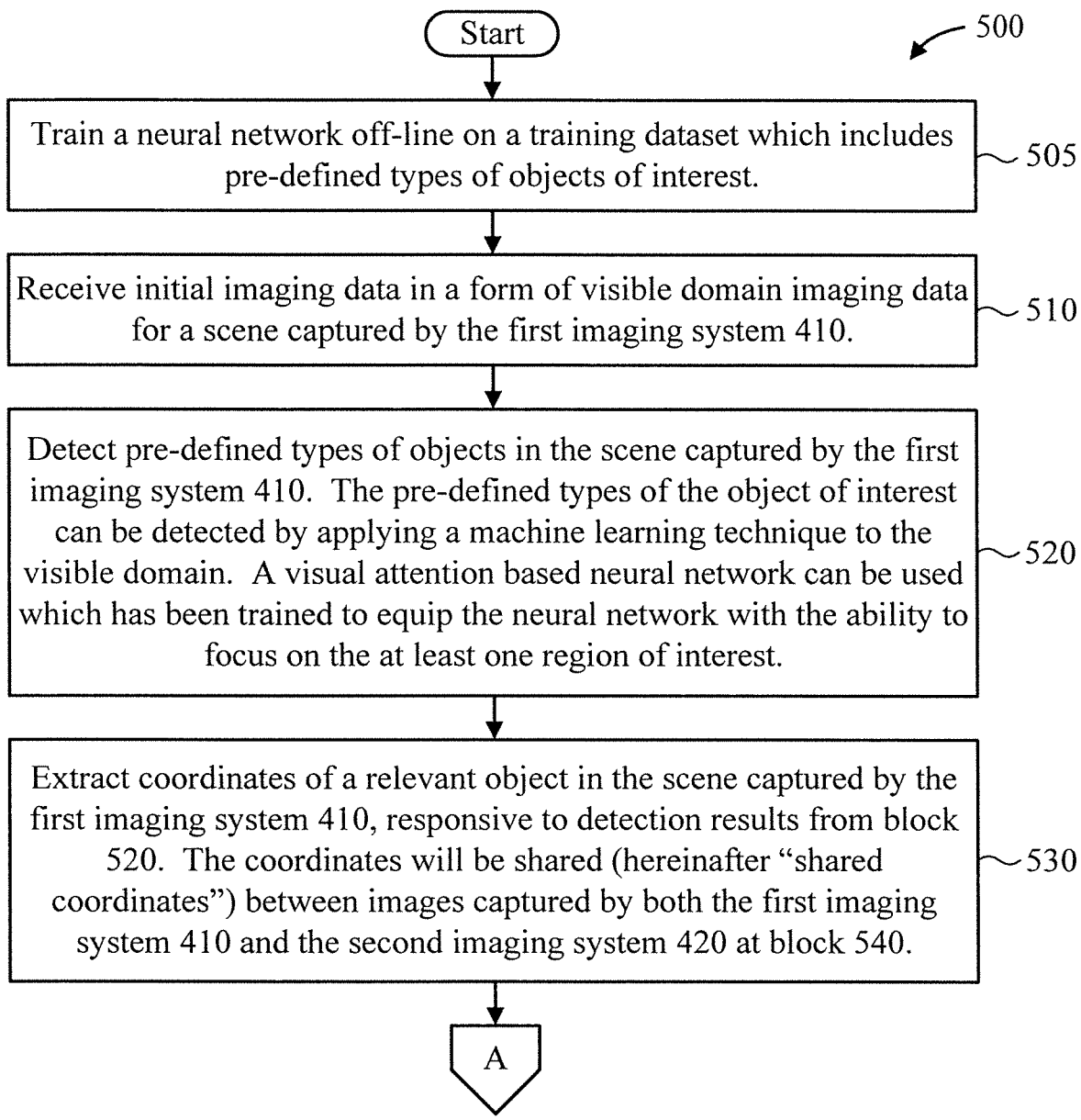
FIGS. 5-6 are flow diagrams showing an exemplary method for guided multi-spectral inspection, in accordance with an embodiment of the present invention.
Figure 6:
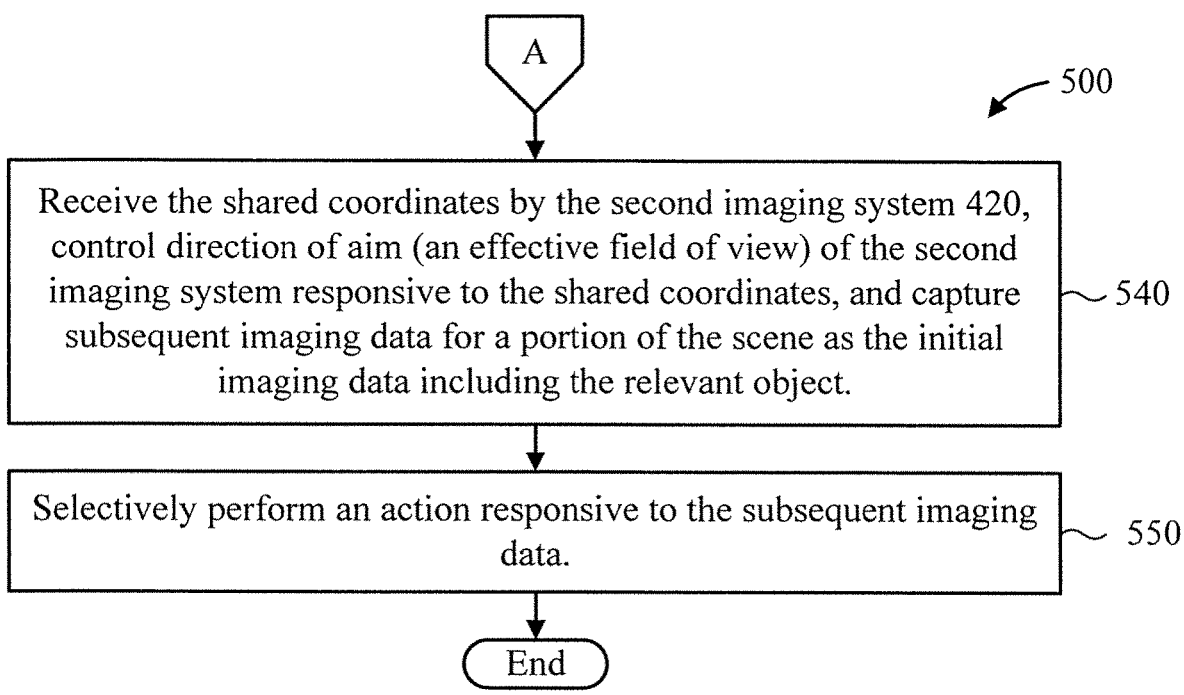

FIGS. 5-6 are flow diagrams showing an exemplary method 500 for guided multi-spectral inspection, in accordance with an embodiment of the present invention.

At block 505, train (i.e., optimize the connections between the neurons) a neural network off-line on a training dataset which includes pre-defined types of objects of interest.

At block 510, receive initial imaging data in a form of visible domain imaging data for a scene captured by the first imaging system 410.

At block 520, detect pre-defined types of objects in the scene captured by the first imaging system 410. In an embodiment, the pre-defined types of the object of interest can be detected by applying a machine learning technique to the visible domain. In an embodiment, a visual attention based neural network can be used which has been trained to equip the neural network with the ability to focus on the at least one region of interest.

At block 530, extract coordinates of a relevant object in the scene captured by the first imaging system 410, responsive to detection results from block 520. The coordinates will be shared (hereinafter "shared coordinates") between images captured by both the first imaging system 410 and the second imaging system 420 at block 540.

At block 540, receive the shared coordinates by the second imaging system 420, control a direction of aim (effective Field of View (FoV)) of the second imaging system responsive to the shared coordinates, and capture subsequent imaging data for a portion of the scene as the initial imaging data including the relevant object. While the same coordinates are used, it is to be appreciated that overlapping areas, non-overlapping area, a smaller area, a sampled area, and so forth may be captured as subsequent imaging data relative to the initial imaging data depending upon the characteristics of the second imaging system and the relative locations between the first and the second imaging systems. In an embodiment, in an absence of receiving the shared coordinates, the second imaging system 420 is not activated, thus avoiding any energy consumption associating with unnecessarily activating the second imaging system 420.

At block 550, selectively perform an action responsive to the subsequent imaging data.

For example, in an embodiment, an autonomously driven motor vehicle is controlled responsive to the subsequent imaging data. Such control can involve, braking, steering, accelerating, and so forth. Such control can be performed to autonomously drive the car in a safe manner and can also be used for autonomous obstacle avoidance by automatically controlling the vehicle via braking, steering, or accelerating to avoid an impending collision with an object of interest. Further to that end, a user can be alerted to obstacles to enable the user to take control and avoid the obstacles or to be simply put on notice of the obstacle while the vehicle is automatically controlled to avoid the object. The vehicle can be a vehicle on the road, a vehicle (e.g., pallet loader, forklift, robot capable of motion, and so forth) used in a warehouse or manufacturing facility, and so forth. For this application is worth noting that a mmWave imaging system can see through common visibility obstructions such as fog and smoke. For example, a first imaging system in the visible domain can activate a second imaging system in the mmWave domain and direct its aim to a portion of the scene where there is smoke to find if there is an obstacle behind the smoke.

In another embodiment, the first imaging system can be located on a first vehicle (e.g., an unmanned aerial vehicle (UAV) having, e.g., RGB and/or IR cameras) and the second imaging system can be located in a second vehicle (e.g., having a mmWave radar imaging system). The second vehicle as well as the second imaging system on board can be directed to the same or similar scene captured by the first vehicle. In this way, a more capable (second) vehicle platform can be selectively deployed only when needed based on the initial imaging data and processing thereof.

While an example involving two vehicles has been described, one for each of the first imaging system 410 and the second imaging system 420, in other embodiments, only one of the imaging systems 410 or 420 is vehicle mounted, with the other being stationary in one location. In an embodiment, the imaging system that is stationary in location can nonetheless be capable of rotation and all 3D movements to achieve a targeted image capture.

In an embodiment, the target environment can be a train platform, where a fixed camera or movable camera is used to capture images of the platform from which a positional information of a suspect bag is determined. A mmWave scanner can be directed to the location of the bag to estimate the nature of its contents, for example the presence of a large metallic object.

In an embodiment, a cloud computing platform can be used to perform the processing of the initial imaging data (e.g., to determine whether to initiate a call for the second vehicle, e.g., at all) and then perform the positional calculations and so forth to provide positional data to a specific controller tasked with controlling the FoV or direction of aim of the second imaging system in order to capture a region of interest within the imaging data captured by the first imaging system. To that end, any of various different types of cloud computing platforms, as described in further detail herein below with respect to FIGS. 7 and 8, can be used to perform at least a portion of the steps of method 500.

It is to be appreciated that the steps of method 500 can be repeated for each or some images captured by the first imaging system 410 per block 510.

A further description will now be given of block 520 of method 500, in accordance with an embodiment of the present invention.

Object recognition is a computer vision method that aims to identify classes of objects in images and localize them. Object recognition is a trainable deep learning method that can also be pre-trained on a bigger dataset. Object recognition can be associated with a segmentation algorithm that localizes the given object and affiliates it with a bounding box and coordinates. The object detector can then share regions of interest with the radar using the right calibration method.

A further description will now be given of block 320 of method 300, in accordance with another embodiment of the present invention.

Attention mechanisms are machine learning methods that allow to smartly select relevant parts of data (image) given a certain context. An attention mechanism is a part of a neural network that needs to be trained to select a specific region of interest (hard or soft, where soft attention refers to building a map of attention weights, while hard attention refers to picking an exact location). For some applications, the attention mechanism can attend to different regions at the same time or in a sequence. An attention mechanism can be part of a multi-step reasoning process that is driving the attention from one part of the image to another in order to perform a certain task. The object detector can then share regions of interest with the radar using the right calibration method.

Figure 7:
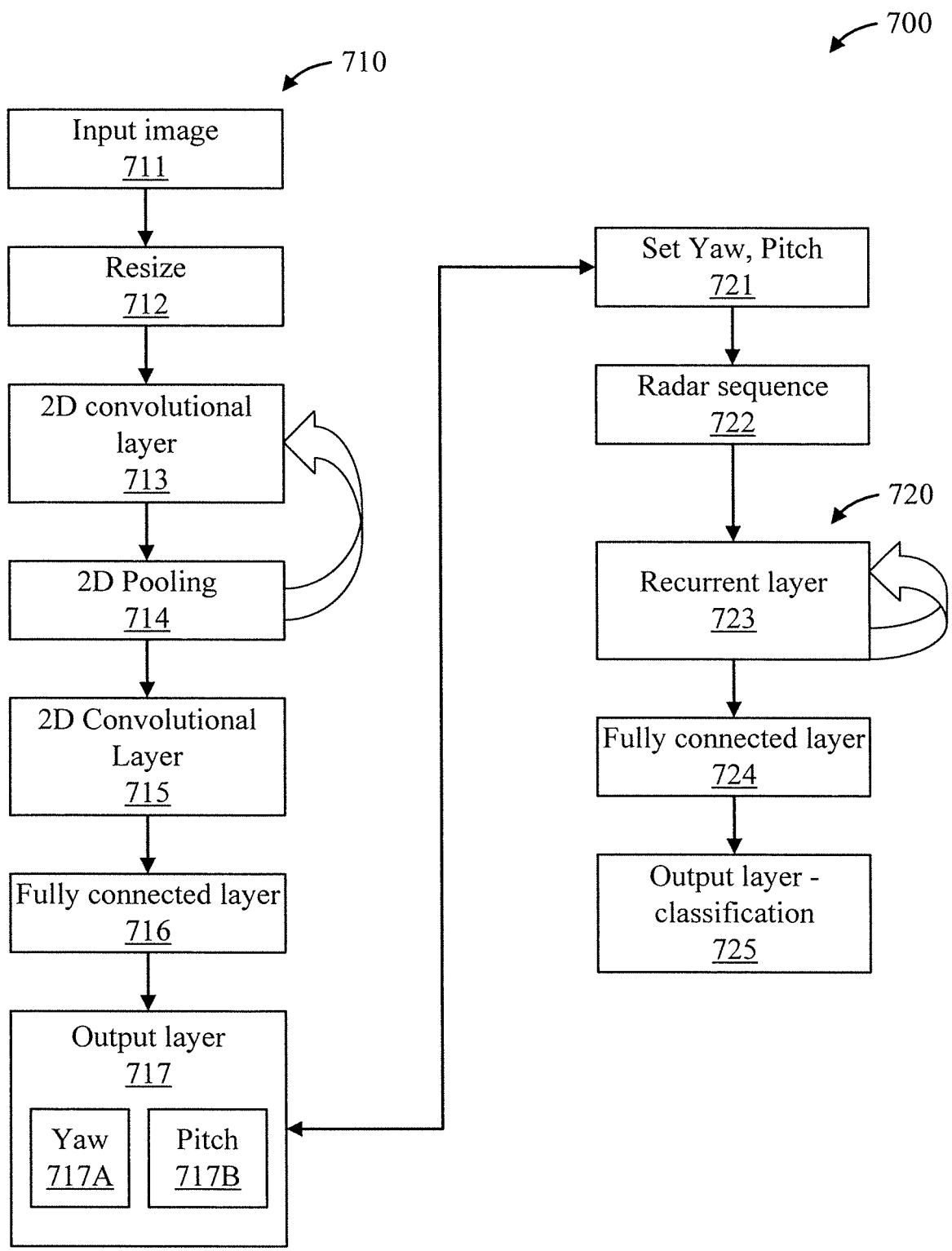
FIG. 7 is a block diagram showing an exemplary neural network configuration used by the system of FIG. 4, in accordance with an embodiment of the present invention.

FIG. 7 is a block diagram showing an exemplary neural network configuration 700 used by system 400, in accordance with an embodiment of the present invention. In particular, neural network configuration 600 is used by the sensor control and data processing sub-system 430.

The neural network configuration 700 involves a neural network 710 trained (i.e., the connections between the neurons have been optimized) off-line on a training dataset which includes pre-defined types of objects of interest.

The neural network configuration 700 further involves a visual attention based neural network 710 which has been trained to equip the neural network 720 with the ability to focus on at least one region of interest.

The neural network 710 is implemented to include a visual attention based neural network corresponding to a first modality. The neural network 710 is connected to a second modality pipeline 720. In the embodiment of FIG. 7, the second modality pipeline is a mmWave radar processing pipeline. In other embodiments, other types of modalities can be used for any of the first and the second modalities.

The neural network 710 receives an input image 711 captured by an image sensor(s). The input image 711 is represented by a matrix with one or more wavelength channels (e.g., RGB, etc.). The input image 711 is resized in a resizing operation 712, and then fed into the neural network 710. The neural network 710 includes multiple repetitions of at least one 2D convolutional layer (collectively denoted by the figure reference numeral 713) followed by a 2D pooling layer 714. The neural network 710 further includes a last 2D convolutional layer 715, followed by a fully connected layer 716 which is connected to an output layer 717 for final results.

An output layer 717 includes two cells, namely yaw 717A and pitch 717B, with both positive and negative values, matching the equivalent values for the second image sensor, for example a mmWave radar imager.

Relative to the mmWave radar image processing pipeline 720, the yaw 717A and pitch 717B values from the neural network 710 are used to set 721 the center of the effective FoV for the mmWave radar. The mmWave imager operates by scanning a beam over the FoV. A sequence of radar readings 722 is processed using a recurrent neural network as the mmWave radar processing pipeline 720. Accordingly, the second modality based neural network 720 includes one or more recurrent layers (collectively denoted by the figure reference numeral 723) and a fully connected layer 724 connected to an output layer 725 for an output classification.

Thus, for a first modality relating to an image, a bag on a platform can be detected in/as a first region of interest using a first mode capture device (e.g., a RGB camera) and visual attention. Positional information relating to the region of interest can be used to direct a second mode capture device (e.g., a mmWave radar). The output layer could confirm the bag contents as a possible threat or not as an output classification.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
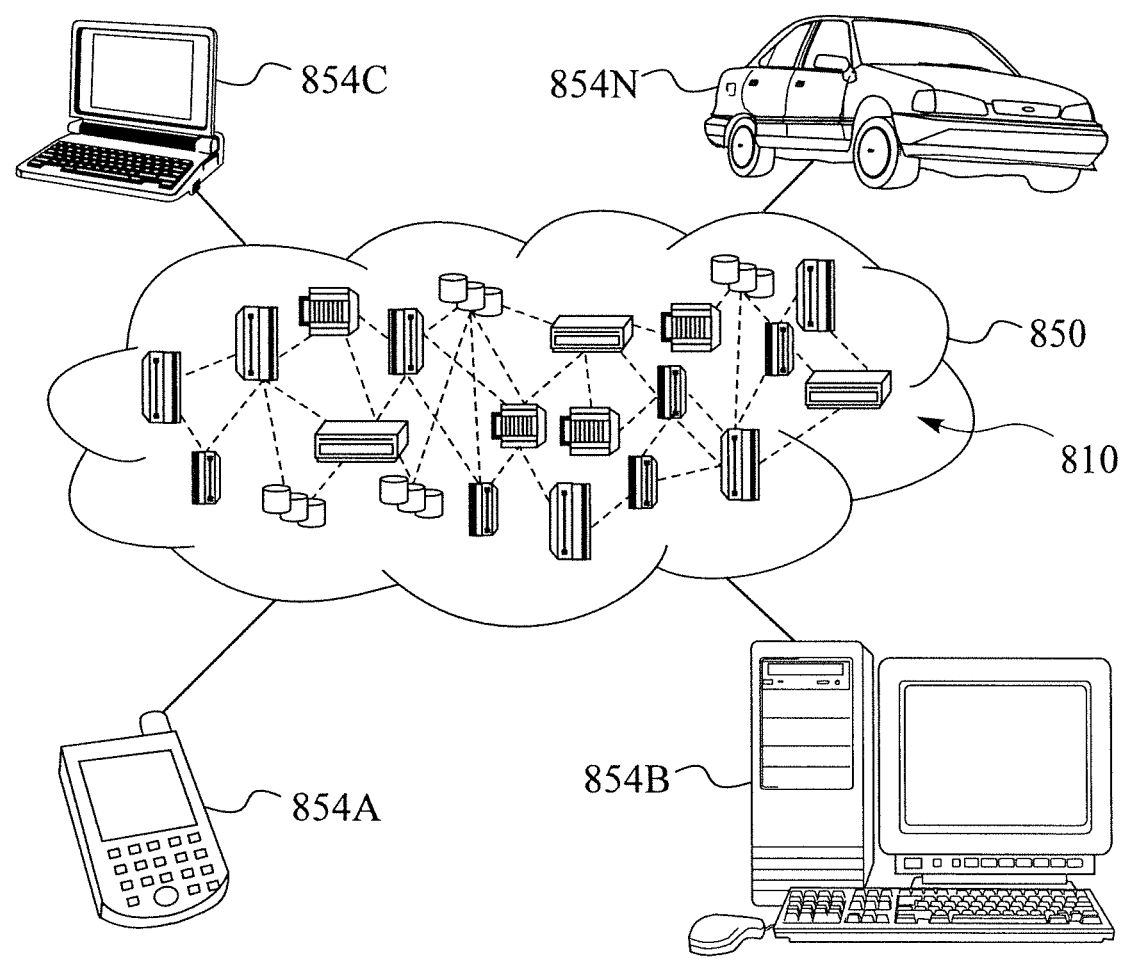
FIG. 8 is a block diagram showing an illustrative cloud computing environment having one or more cloud computing nodes with which local computing devices used by cloud consumers communicate, in accordance with an embodiment of the present invention.

Referring now to FIG. 8, illustrative cloud computing environment 850 is depicted. As shown, cloud computing environment 850 includes one or more cloud computing nodes 810 with which local computing devices used by cloud consumers, such as, for example, personal digital assistant (PDA) or cellular telephone 854A, desktop computer 854B, laptop computer 854C, and/or automobile computer system 854N may communicate. Nodes 810 may communicate with one another. They may be grouped (not shown) physically or virtually, in one or more networks, such as Private, Community, Public, or Hybrid clouds as described hereinabove, or a combination thereof. This allows cloud computing environment 850 to offer infrastructure, platforms and/or software as services for which a cloud consumer does not need to maintain resources on a local computing device. It is understood that the types of computing devices 854A-N shown in FIG. 8 are intended to be illustrative only and that computing nodes 810 and cloud computing environment 850 can communicate with any type of computerized device over any type of network and/or network addressable connection (e.g., using a web browser).

Figure 9:
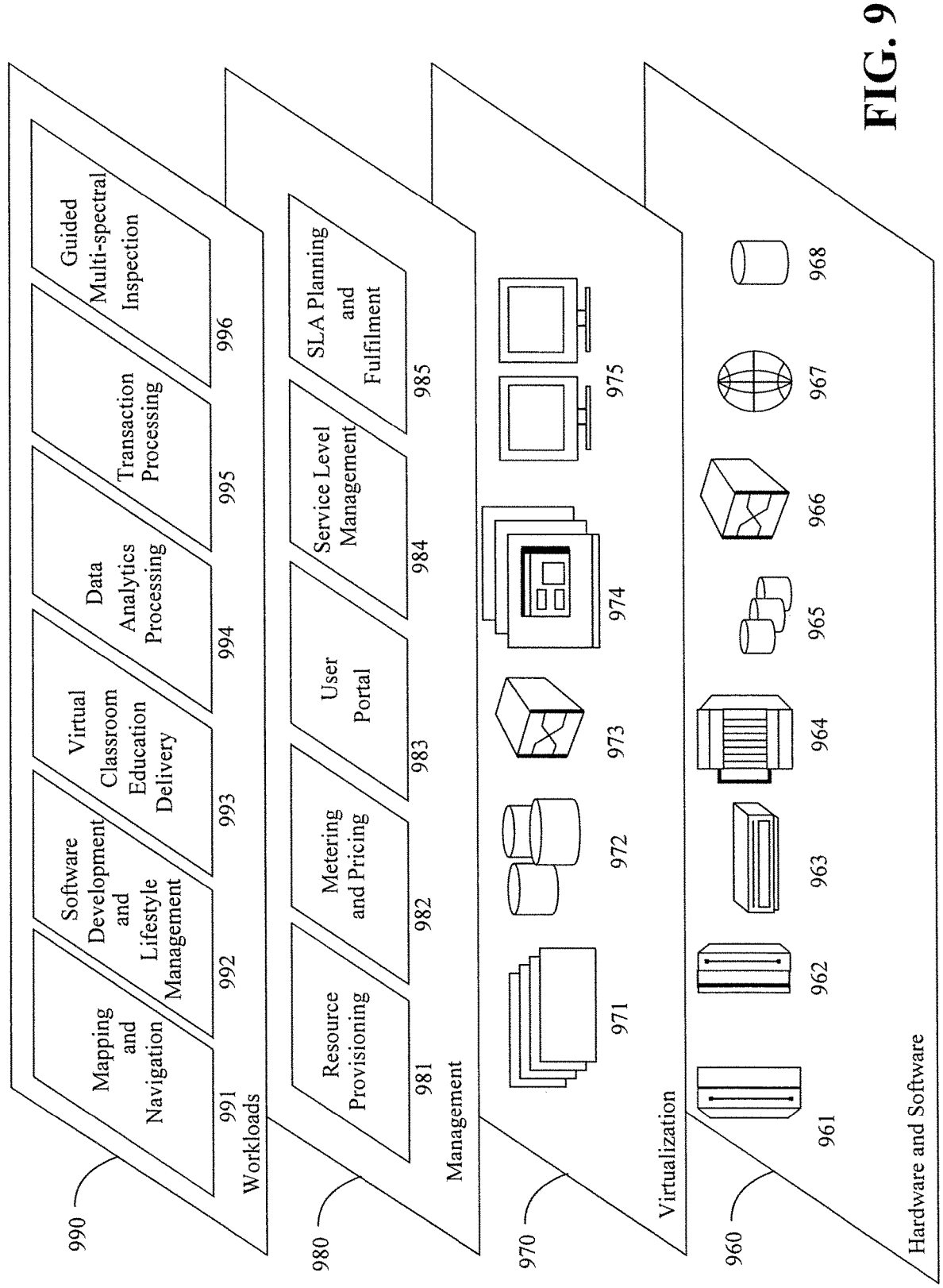
FIG. 9 is a block diagram showing a set of functional abstraction layers provided by a cloud computing environment, in accordance with an embodiment of the present invention.

Referring now to FIG. 9, a set of functional abstraction layers provided by cloud computing environment 850 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 960 includes hardware and software components. Examples of hardware components include: mainframes 961; RISC (Reduced Instruction Set Computer) architecture based servers 962; servers 963; blade servers 964; storage devices 965; and networks and networking components 966. In some embodiments, software components include network application server software 967 and database software 968.

Virtualization layer 970 provides an abstraction layer from which the following examples of virtual entities may be provided: virtual servers 971; virtual storage 972; virtual networks 973, including virtual private networks; virtual applications and operating systems 974; and virtual clients 975.

In one example, management layer 980 may provide the functions described below. Resource provisioning 981 provides dynamic procurement of computing resources and other resources that are utilized to perform tasks within the cloud computing environment. Metering and Pricing 982 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 983 provides access to the cloud computing environment for consumers and system administrators. Service level management 984 provides cloud computing resource allocation and management such that required service levels are met. Service Level Agreement (SLA) planning and fulfillment 985 provide pre-arrangement for, and procurement of, cloud computing resources for which a future requirement is anticipated in accordance with an SLA.

Workloads layer 990 provides examples of functionality for which the cloud computing environment may be utilized. Examples of workloads and functions which may be provided from this layer include: mapping and navigation 991; software development and lifecycle management 992; virtual classroom education delivery 993; data analytics processing 994; transaction processing 995; and guided multi-spectral inspection 996.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:
1. An imaging system, comprising:
a first imaging system that captures initial sensor data in a form of visible domain data;
a second imaging system, on a vehicle, that captures subsequent sensor data in a form of second domain data, wherein the initial and the subsequent sensor data are of different spectral domains; and
a controller subsystem, operatively coupled to the first and second imaging systems, that
detects at least one region of interest in a scene in real-time by applying a soft visual attention based neural network trained using attention weights to focus on regions of interest and pre-defined types of objects of interest in the visible domain data from the first imaging system,
localizes, using the soft visual attention based neural network, at least one object of interest in the at least one region of interest to generate positional data for the at least one object of interest, and
autonomously deploys the vehicle to the scene and steers a point of focus of the second imaging system to a region of the scene including the object of interest to capture the second domain data responsive to the positional data, wherein the first and the second imaging systems share a common set of x and y coordinates for any captured scenes, the positional data being generated based on the common set, and being used to control an effective field of view (FoV) of the second imaging system, the controller subsystem being further configured for dynamically adjusting an effective Field of View (FoV) of the second imaging system based on real-time coordinates changes detected through the first imaging system.

2. The imaging system of claim 1, further comprising autonomously providing depth information and material properties of the at least one object.

3. The imaging system of claim 1, wherein the first imaging system comprises an imaging device selected from the group consisting of an RGB camera, an InfraRed (IR) camera, and a thermal camera.

4. The imaging system of claim 3, wherein the second imaging system comprises a radar imaging system.

5. The imaging system of claim 3, wherein the second imaging system comprises a mm Wave imaging system.

6. The imaging system of claim 1, wherein localize the at least one object of interest comprises extracting coordinates of the at least one object of interest.

7. The imaging system of claim 1, wherein the second domain data includes information from the scene unobservable in the visible domain.

8. The imaging system of claim 1, further comprising controlling an autonomously driven motor vehicle responsive to the subsequent sensor data.

9. The imaging system of claim 1, wherein the first imaging system is on an unmanned aerial vehicle (UAV), and the first imaging system comprises an imaging device selected from the group consisting of an RGB camera, an InfraRed (IR) camera, and a thermal camera.

10. The imaging system of claim 1, wherein the first imaging system is a thermal camera for detecting temperature hot spots in the scene as the at least one region of interest.

11. The imaging system of claim 1, wherein the controller subsystem is configured in a cloud computing configuration.

12. A method for imaging, comprising:
capturing, by a first imaging system, initial sensor data in a form of visible domain data;
capturing, by a second imaging system on a vehicle, subsequent sensor data in a form of second domain data, the initial and the subsequent sensor data being of different spectral domains;
detecting, by a controller subsystem, at least one region of interest in a scene in real-time by applying a soft visual attention based neural network trained using attention weights to focus on regions of interest and pre-defined types of objects of interest in the visible domain data from the first imaging system;
localizing, by the controller subsystem using the soft visual attention based neural network, at least one object of interest in the at least one region of interest to generate positional data for the at least one object of interest; and
autonomously deploying, by the controller subsystem, the vehicle to the scene and steering a point of focus of a second imaging system to the scene to capture subsequent sensor data in a form of second domain data responsive to the positional data, wherein the initial and the subsequent sensor data are of different spectral domains, the first and the second imaging systems sharing a common set of x and y coordinates for any captured scenes, the positional data being generated based on the common set, and being used to control an effective field of view (FoV) of the second imaging system, the controller subsystem being further configured for dynamically adjusting an effective Field of View (FoV) of the second imaging system based on real-time coordinates changes detected through the first imaging system.

13. The method of claim 12, wherein the second domain data includes information from the scene unobservable in the visible domain.

14. The method of claim 12, further comprising autonomously providing depth information and material properties of the at least one object.

15. The method of claim 12, wherein localize the at least one object of interest comprises extracting coordinates of the at least one object of interest.

16. The method of claim 12, further comprising controlling an autonomously driven motor vehicle responsive to the subsequent sensor data.

17. A computer program product for imaging, the computer program product comprising a non-transitory computer readable storage medium having program instructions embodied therewith, the program instructions executable by a computing system to cause the computing system to perform a method, the method comprising:
capturing, by a first imaging system of the computing system, initial sensor data in a form of visible domain data;
detecting, by a controller subsystem of the computing system, at least one region of interest of a scene in real-time by applying a soft visual attention based neural network trained using attention weights to focus on regions of interest and pre-defined types of objects of interest in the visible domain data from the first imaging system;
localizing, by the controller subsystem using the soft visual attention based neural network, at least one object of interest in the at least one region of interest to generate positional data for the at least one object of interest; and
autonomously deploying, by the controller subsystem, a vehicle having a second imaging system and steering a point of focus of the second imaging system to the scene to capture subsequent sensor data in a form of second domain data responsive to the positional data,
wherein the initial and the subsequent sensor data are of different spectral domains, the first and the second imaging systems sharing a common set of x and y coordinates for any captured scenes, the positional data being generated based on the common set, and being used to control an effective field of view (FoV) of the second imaging system, the controller subsystem being further configured for dynamically adjusting an effective Field of View (FoV) of the second imaging system based on real-time coordinates changes detected through the first imaging system.

* * * * *